May 3, 1955  A. J. DAHMS  2,707,640
CHUCK FOR MOLTEN GLASS STIRRING IMPLEMENT OR THE LIKE
Filed Aug. 24, 1953
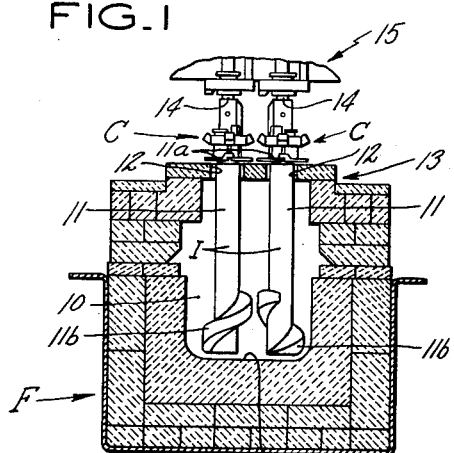
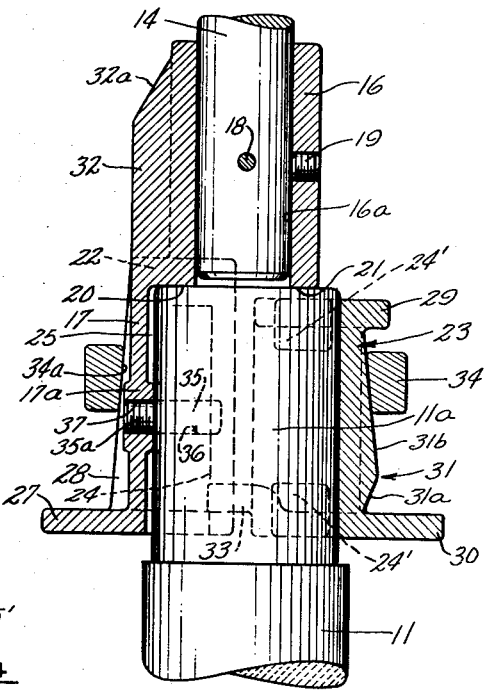
INVENTOR
ARTHUR J. DAHMS
BY Bates + Willard
ATTORNEYS United States Patent Office 2,707,640
Patented May 3, 1955

2,707,640

CHUCK FOR MOLTEN GLASS STIRRING IMPLEMENT OR THE LIKE

Arthur J. Dahms, Glastonbury, Conn., assignor to Emhart Manufacturing Company, Hartford, Conn., a corporation of Delaware Application August 24, 1953, Serial No. 376,023

6 Claims. (Cl. 279—45)

This invention relates to improvements in chucks for engaging the upper ends of vertical molten glass stirring implements or the like so as to suspend such implements so that they depend into places of high temperature, as into a body or stream of molten glass in a glass feeder forehearth or like place.

Chucks heretofore employed in the service described generally have included screws to be tightened to retain their clamping parts engaged with the implements to be suspended therefrom and to be loosened to disengage or release such implements. Because of the high temperature and other adverse conditions to which the parts involved are subjected in the service of the chucks and suspended implements, the screw-threaded engaged parts may be "seized" or jammed and the screws can be loosened when required only with great difficulty, if at all. Indeed, it is customary to cut through the screws between the separable chuck jaws and this then necessitates drilling out of waste parts and re-tapping of screw holes.

An object of the invention is to provide a chuck of the character described having relatively separable clamping jaws or parts and simple but effective means for releasably securing such jaws or parts in clamping relation to an implement held thereby without use of any screw-threaded fastening means to effect this result and so that such securing means can be quickly and easily manipulated to release the clamping jaws or parts for relative movements to release the implement.

A further object of the invention is to provide a chuck of the character described having a pair of relatively movable clamping jaws and an associate locking ring and other cooperative elements, the arrangement being such that in one set of relative positions of the jaws and the locking ring such jaws are releasably retained by the ring in frictional contact with opposite sides of an interposed upper end portion of a vertical implement depending from the chuck and in another set of relative positions of the jaws and the locking ring one of the jaws is releasably retained by the ring in a relatively raised out-of-the-way position above the level of the other jaw and of the upper end of the implement when the latter is in position to be held in the chuck.

Other objects and advantages of the invention hereinafter will be pointed out or will become apparent from the following description of a practical embodiment thereof as illustrated in the accompanying drawings, in which:

Fig. 1 is a relatively reduced vertical cross section of a feeder forehearth having stirring implements therein suspended from chucks of the present invention;

Fig. 2 is a top plan view of the chuck alone but with parts thereof in the relative positions which they occupy when a vertical stirring implement is suspended therefrom;

Fig. 3 is a side elevation of the chuck;

Fig. 4 is a vertical cross section of the chuck along line 4—4 of Fig. 1 with a view in elevation of a fragmentary upper end portion of an implement suspended therefrom; and Fig. 5 is a view like Fig. 4 but with the fragmentary upper end portion of the implement shown in phantom lines and with a movable jaw of the chuck retained by the locking ring in its raised out-of-the-way position.

In Fig. 1, a glass feeder forehearth, designated generally F, has a glass flow channel 10 which in normal use holds a body or stream of molten glass (not shown) of substantial depth. Stirring implements, designated generally I, comprise vertical shanks 11 extending through vertical openings 12 in a cover structure 13 that is included in the forehearth. The upper extremities of implement shanks 11 may be of reduced diameter as indicated at 11a, Figs. 1, 4 and 5, and are held by chucks C which are fixed on lower ends of rotary vertical shafts or spindles 14 depending from a supporting structure which is partially shown and is indicated at 15. The arrangement is such that in normal use of the stirring implements the chucks C are located just above the upper ends of the openings 12 in the forehearth cover and the lower ends of the implement shanks which are appropriately formed as indicated at 11b for glass stirring action are spaced slightly above the bottom 10a of the forehearth channel. It will be understood that in this arrangement the chucks necessarily will be subjected to considerable heat and to adverse action thereon of hot gases escaping through the openings 12 around the implement shanks.

The chuck C comprises a vertically disposed tubular body 16 from which depends a fixed jaw 17 which may be formed as an integral downward and outwardly offset extension of a portion only of the wall of the tubular body. The jaw 17 has a generally arcuate shape in cross-section. In the example shown, the tubular body 16 is adapted to fit on the lower end portion of a shaft or spindle 14 and to be secured thereto by suitable fastening means, as by a cross pin 18 and a set screw 19. Tubular body 16 therefore has its bore, 16a, circular in cross-section to correspond to the cross-sectional configuration of such shaft or spindle. The upper end portion 11a of the implement shank for which the illustrative chuck is especially adapted is also circular but is of greater radial extent than lower end of the shaft or spindle. The radius of curvature of the arcuately shaped fixed jaw 17 therefore is longer than that of tubular body 16 and a downwardly facing shoulder 20 flush with lower end surface 21 of tubular body 16 is provided by an integral outturned connecting web 22 between the upper portion of jaw 17 and the lower end of part of the tubular body 16. The arcuate extent of jaw 17 in the example shown is slightly less than 180° but it may vary in other examples from 180° to considerably less than that shown.

A separately formed movable jaw 23 is provided to have substantially the same generally arcuate shape in cross-section, the same radius of curvature and the same arcuate extent as the fixed jaw 17. I prefer to form the inner surfaces of these jaws so that each jaw will be adapted for contact with the peripheral surface of the implement end to be held over a plurality of angularly spaced smaller-area contact faces rather than over the entire inner surface of the jaw. Accordingly the jaw 17 is formed at its inner surface to provide a pair of symmetrically located relatively raised contact faces or lands 24 respectively located at opposite sides of a vertically extending median relatively depressed portion or groove 25 and flanked by vertically extending side edge relatively depressed portions or grooves 26. The jaw 23 is formed at its inner surface to provide similar relatively raised contact faces or lands 24', a median relatively depressed portion or groove 25' and side edge relatively depressed portions or grooves 26'.

Fixed jaw 17 is formed with an outstanding bottom flange 27 at its lower extremity and with a pair of symmetrically located upwardly tapering vertical ribs 28 on its back or outer surface. These are located nearer the vertical side edges of jaw 17 than to the vertical median line of the jaw back in the example shown and taper uniformly from a maximum outward extent at the bottom flange to a practically zero extent at the top of the jaw. They may be otherwise located and have a different taper and, as will be understood from the explanation hereinafter given of their use, the number thereof on the back of the jaw might be only one or more than two if desired.

The jaw 23 is formed with a relatively narrower outturned top flange 29 and with a wider outturned bottom flange 30. Also, with a vertical rib 31 on its back at a location approximately midway between the vertical side edges of the jaw. The rib 31 comprises a relatively shorter downwardly tapered, lower end portion 31a and a longer upwardly tapered main portion 31b, the taper of main portion 31b approximating that of the corresponding portions of the ribs 28 on jaw 17 while the outer surface of lower end portion 31a is more sharply inclined.

Tubular body 16 is formed with an external vertical rib 32 at approximately the middle line of the side thereof from which the jaw 17 depends. Rib 32 is formed with an inclined or beveled outer surface 32a near the upper end of such rib.

Movable jaw 23 is provided with a pair of rigid stop elements 33 projecting from the ends of its bottom flange 30 beyond the vertical side edges of such jaw with the lower surfaces of these elements approximately flush with the upper surface of bottom flange 30. These stop elements may be integral fingers projecting from the end portions of the flange 30. When the movable jaw 23 is disposed in adjacent, confronting relation to the fixed jaw 17 with the bottom flanges of these two jaws at about the same level, the projecting stop fingers 33 on bottom flange 30 of jaw 23 will partially overlie and bear on the upper surface of bottom flange 27 of jaw 17. A locking ring 34 encircles the jaws 17 and 23 and contacts at different places around its inner circumference with the upwardly inclined outer surfaces of ribs 28 on the fixed jaw 17 and main portion 31b of rib 31 on the movable jaw 23, whereby the movable jaw will be restrained against tilting outward at its upper end away from jaw 17 and hence prevented from moving downward relative to jaw 17 beyond the position shown in Fig. 3. When the jaws are in the positions shown in this view, being the positions for clamping between them the upper end portion of an implement such as that of implement shank 11, the inner peripheral surface, 34a, of such ring will bear throughout its vertical extent with the inclined surfaces of ribs 28 on jaw 17 and rib portion 31b on jaw 23 at a level considerably above that of the place of greatest outward extension or thickness of rib portion 31b, such inner peripheral surface being suitably frusto-conical or downwardly enlarging to match the taper of the ribs involved. The movable jaw 23 will be retained in its raised, out-of-the-way position as shown in Fig. 5 by the same locking ring, the inner peripheral surface of which then bears at diametrically opposite places against inclined surface 32a on rib 32 of chuck body 16 and the cooperatively inclined outer surface of rib portion 31a on raised movable jaw 23, respectively, until the implement upper end 11a has been placed in the position shown in Figs. 4 and 5. The implement may be retained in this position while the movable jaw is raised by a supporting stud 35 which projects radially inward from the approximate central portion of the inner surface of jaw 17 and fits snugly in a radial bore 36 in the implement upper end portion. The portion of jaw 17 that carries the stud 35 may be embossed or thickened as indicated at 17a and a threaded radial hole 37 may be tapped therein for engagement with a threaded outer end portion 35a of stud 35 which is screwed thereinto. The vertical distance between the center line of the radial bore 36 in the implement end portion 11a and the upper end surface of that implement is just enough less than the corresponding distance between the center line of stud 35 and the plane of downwardly facing shoulder 20 and bottom end surface 21 of chuck body 16 to permit the implement to be shifted laterally to the position shown in phantom in Fig. 5 from a position (not shown) farther to the right but not enough to prevent contact of the upper end surface of the implement with the surfaces 20 and 21 of the chuck body when the implement is in place. This contact will aid in maintenance of a firm, rigid connection between the implement and the chuck-body and shaft or spindle 14 when the implement end is in the position shown in Figs. 4 and 5, the movable jaw 23 has been lowered from its raised position to that shown in Figs. 3 and 4, and the locking ring 34 has been lowered from the position shown in Fig. 5 to the position shown in Fig. 3 and has been pressed firmly downward against the inclined surfaces of the engaged vertical ribs on the jaws to releasably maintain these jaws firmly clamped to the implement end.

The locking ring 34 may be formed at intervals around its circumference with outstanding integral knobs or bosses 38 suitable to be struck by a hammer in the hand of a workman should start of upward displacement of the ring be difficult when removal of the implement from the chuck is to be effected. It is to be noted in this connection that the supporting structure 15 of Fig. 1 may be mounted in a known manner by means (not shown) so that it and the parts suspended therefrom, including the chucks and suspended implements may be raised and swung laterally to position the chucks and implements at a place removed from the heat of the forehearth and more accessible to the operator who is to remove and replace the implements. The knobs or bosses 38 may be provided with sockets 39 into which ends of rigid rods or suitable implements (not shown) may be stuck and the rods or implements struck with a hammer or manipulated to loosen the ring or aid in moving it to its raised position should the operator so desire.

Various modifications of or changes in the details of the illustrative device shown in the accompanying drawings and herein particularly described will now be obvious to those skilled in the art and I therefore do not wish to be limited to such details.

I claim:

1. A chuck of the character described comprising a tubular body adapted to fit on and be fixed to the lower end portion of a depending vertical shaft or the like, whereby said tubular body will be disposed in a vertical position, a fixed jaw joined integrally with the tubular body so as to extend downwardly therefrom at one side thereof, said fixed jaw being generally arcuate in cross-sectional configuration, a movable jaw also of generally arcuate shape in cross-sectional configuration and adapted for cooperation with the fixed jaw to grip between them an interposed upper end portion of an implement to be held by the chuck, and a locking ring movable from a higher position in which it encircles the tubular body to a lower position around the fixed jaw and the movable jaw and the interposed upper end portion of the implement to be held, said locking ring being engageable with said jaws when in said lower position to maintain them firmly clamped to said implement upper end portion, said movable jaw being provided with projecting rigid stop means adapted to strike the fixed jaw to prevent further downward movement of the movable jaw relative to the fixed jaw when the movable jaw has been moved from its said higher position downwardly to its said lower position.

2. A chuck of the character described comprising a tubular body adapted to fit on and be fixed to the lower end portion of a depending vertical shaft or the like, whereby said tubular body will be disposed in a vertical position, a fixed jaw joined integrally with the tubular body so as to extend downwardly therefrom at one side thereof, said fixed jaw being generally arcuate in cross-sectional configuration, a movable jaw also of generally arcuate shape in cross-sectional configuration and adapted for cooperation with the fixed jaw to grip between them an interposed upper end portion of an implement to be held by the chuck, and a locking ring movable from a higher position in which it encircles the tubular body to a lower position around the fixed jaw and the movable jaw and the interposed upper end portion of the implement to be held, said locking ring being engageable with said jaws when in said lower position to maintain them firmly clamped to said implement upper end portion, said fixed jaw and said movable jaw being provided with upwardly tapering vertical ribs on their outer surfaces and said locking ring being formed with an upwardly tapering inner surface to match the taper of the ribs on said jaws.

3. A chuck of the character described comprising a tubular body adapted to fit on and be fixed to the lower end portion of a depending vertical shaft or the like, whereby said tubular body will be disposed in a vertical position, a fixed jaw joined integrally with the tubular body so as to extend downwardly therefrom at one side thereof, said fixed jaw being generally arcuate in cross-sectional configuration, a movable jaw also of generally arcuate shape in cross-sectional configuration and adapted for cooperation with the fixed jaw to grip between them an interposed upper end portion of an implement to be held by the chuck, and a locking ring movable from a higher position in which it encircles the tubular body to a lower position around the fixed jaw and the movable jaw and the interposed upper end portion of the implement to be held, said locking ring being engageable with said jaws when in said lower position to maintain them firmly clamped to said implement upper end portion, said fixed jaw and said movable jaw being provided with outturned flanges at their bottom ends and said movable jaw being provided with projecting rigid stop elements on its said flange for contact with the upper surface of the flange on the fixed jaw to stop further downward movement of the movable jaw when the latter has been moved downwardly from its higher to its lower position.

4. A chuck of the character described comprising a tubular body adapted to fit on and be fixed to the lower end portion of a depending vertical shaft or the like, whereby said tubular body will be disposed in a vertical position, a fixed jaw joined integrally with the tubular body so as to extend downwardly therefrom at one side thereof, said fixed jaw being generally arcuate in cross-sectional configuration, a movable jaw also of generally arcuate shape in cross-sectional configuration and adapted for cooperation with the fixed jaw to grip between them an interposed upper end portion of an implement to be held by the chuck, a locking ring movable from a higher position in which it encircles the tubular body to a lower position around the fixed jaw and the movable jaw and the interposed upper end portion of the implement to be held, said locking ring being engageable with said jaws when in said lower position to maintain them firmly clamped to said implement upper end portion, and a stud projecting radially inward from the fixed jaw for insertion in a radial bore in said implement upper end portion, the vertical distance from the center line of said stud to the plane of the lower end of said tubular body and the vertical distance of the center line of the radial bore in said implement from the plane of the upper end of the implement having been predetermined in relation to each other so that the upper surface of said implement will bear against the lower end of said tubular body when the upper end portion of the implement has been disposed against the fixed jaw with the stud projecting from said jaw disposed in the radial bore of the implement upper end portion.

5. A chuck of the character described comprising a tubular body adapted to fit on and be fixed to the lower end portion of a depending vertical shaft or the like, whereby said tubular body will be disposed in a vertical position, a fixed jaw joined integrally with the tubular body so as to extend downwardly therefrom at one side thereof, said fixed jaw being generally arcuate in cross-sectional configuration, a movable jaw also of generally arcuate shape in cross-sectional configuration and adapted for cooperation with the fixed jaw to grip between them an interposed upper end portion of an implement to be held by the chuck, and a locking ring movable from a higher position in which it encircles the tubular body to a lower position around the fixed jaw and the movable jaw and the interposed upper end portion of the implement to be held, said locking ring being engageable with said jaws when in said lower position to maintain them firmly clamped to said implement upper end portion, said jaws being formed with upwardly tapering vertical ribs on their backs and said locking ring having its inner surface formed with an upward taper to match the taper of said vertical ribs on the jaws, said movable jaw being provided with a downwardly and inwardly inclined surface portion on its back adjacent to its lower end and said tubular body being provided with an upwardly and inwardly inclined external surface on a side thereof opposite the movable jaw and adjacent to the upper end of the tubular body, whereby said locking ring may be engaged at its interior with said upwardly and inwardly inclined surface on the tubular body and said downwardly and inwardly inclined surface on the movable jaw, respectively, to retain said movable jaw on the tubular body in a raised, inactive position above the level of the fixed jaw.

6. A chuck of the character described comprising a vertical tubular body, a depending, outwardly offset, fixed jaw joined integrally to the lower end of the tubular body at one side thereof, said fixed jaw being generally arcuate in cross-sectional configuration, a vertical rib on said tubular body above the fixed jaw, said rib having an upwardly and inwardly inclined surface adjacent near the top of the tubular body, a plurality of upwardly tapering vertical ribs on the back of the fixed jaw, an outturned bottom flange on the fixed jaw, a radial stud projecting inwardly from the central portion of the fixed jaw, a movable jaw arcuate in cross-sectional configuration like the fixed jaw, said movable jaw having an outturned bottom flange provided with rigid stop elements thereon projecting beyond the side edges of the movable jaw for contact with the upper surface of the bottom flange of the fixed jaw to limit downward movement of the movable jaw at the front of the fixed jaw, a vertical rib on the back of the movable jaw, said rib comprising a lower portion having a downwardly and inwardly slanting surface and a main upper portion having an upward taper like the upward taper of the ribs on the fixed jaw, and a locking ring having an inner surface formed with an upward taper to match the taper of the upwardly tapering ribs on said jaws and engageable therewith to hold the jaws clamped to an interposed implement end portion when the movable jaw is disposed at the level of the fixed jaw and in a position cooperatively related thereto, said locking ring also being engageable at its inner surface with the upwardly and inwardly inclined surface on the tubular body and the downwardly and inwardly inclined lower surface portion of the rib on the movable jaw when the movable jaw has been raised upwardly from its cooperative position to an inactive position adjacent to the tubular body and above the level of the fixed jaw, whereby to retain said movable jaw in its raised, inactive position.

References Cited in the file of this patent

UNITED STATES PATENTS

| Number | Name | Date |
|---|---|---|
| Re. 3,005 | Stackpole | June 23, 1868 |
| 718,306 | Boring | Jan. 13, 1903 |
| 730,311 | Stewart | June 9, 1903 |
| 760,598 | Wynegar | May 24, 1904 |
| 609,908 | Juenge | Jan. 19, 1909 |